United States Patent [19]
Dugan et al.

[11] Patent Number: 5,375,200
[45] Date of Patent: Dec. 20, 1994

[54] METHOD AND SYSTEM FOR GRAPHIC INTERACTION BETWEEN DATA AND APPLICATIONS WITHIN A DATA PROCESSING SYSTEM

[75] Inventors: Pamela A. Dugan, Euless; Greg P. Fitzpatrick, Fort Worth; William J. Johnson, Flower Mound; Marvin L. Williams, Lewisville, all of Tex.

[73] Assignee: International Business Machines Corporation, Armonk, N.Y.

[21] Appl. No.: 976,227

[22] Filed: Nov. 13, 1992

[51] Int. Cl.$^5$ .............................. G06F 15/62
[52] U.S. Cl. .................... 395/159; 395/144; 395/155
[58] Field of Search ............... 395/155, 156, 159, 160, 395/161, 144, 145, 146, 147; 364/419.14, 419.17

[56] References Cited

U.S. PATENT DOCUMENTS

| | | | |
|---|---|---|---|
| 4,723,210 | 2/1988 | Barker et al. | 395/159 |
| 4,723,211 | 2/1988 | Barker et al. | 395/159 |
| 4,815,029 | 3/1989 | Barker et al. | 395/159 |
| 4,853,878 | 8/1989 | Brown | 395/145 |
| 4,899,136 | 2/1990 | Beard et al. | 395/159 |
| 5,021,972 | 6/1991 | Nishi | 395/145 |
| 5,051,930 | 9/1991 | Kuwabara et al. | 395/145 |
| 5,140,676 | 8/1992 | Langelaan | 395/145 |
| 5,140,677 | 8/1992 | Fleming et al. | 395/159 |
| 5,146,553 | 9/1992 | Noguchi et al. | 395/145 |
| 5,157,763 | 10/1992 | Peters et al. | 395/161 |
| 5,214,756 | 5/1993 | Franklin et al. | 395/159 |
| 5,289,573 | 2/1994 | Kataoka et al. | 395/156 |

OTHER PUBLICATIONS

"Macintosh Hypercard User's Guide", Apple Computer Inc. (1988).

Alfieri, V., "The Best Book of: Word Perfect Version 5.0", Hayden Books (1989) pp. 81–83.

Barker, B., Hernandez, I., and Machart, B., "Controlling the Editing and Location of Like Objects in an Integrated Environment", IBM Technical Disclosure Bulletin, vol. 27 No. 5 (Oct. 1984), p. 2955.

Prosise, "CARDFILE for the PM: It's Time to Retire Your Rolodex", PC Magazine (Oct. 30, 1990), pp. 361–376.

"Microsoft Windows User's Guide", Microsoft Corp. (1990), pp. 27–28.

Primary Examiner—Heather R. Herndon
Assistant Examiner—N. Kenneth Burraston
Attorney, Agent, or Firm—Norman L. Gundel; Andrew J. Dillon

[57] ABSTRACT

A method and system are disclosed for permitting automatic interaction between data and multiple applications in a data processing system. A selectable graphic representation associated with each application is displayed within the data processing system and after user selection of a particular graphic representation, designated data is automatically transferred to or utilized to access the associated application. A distinctive highlight overlay is associated with each graphic representation and utilized to graphically highlight data selected by user for interaction with a selected application. Alternately, data selected by a user may be utilized to automatically select a particular application to transfer that data to or for access and the distinctive highlight overlay associated with the particular application is then utilized to visually confirm access to that application.

8 Claims, 5 Drawing Sheets

METHOD AND SYSTEM FOR GRAPHIC INTERACTION BETWEEN DATA AND APPLICATIONS WITHIN A DATA PROCESSING SYSTEM

BACKGROUND OF THE INVENTION

1. Technical Field

The present invention relates in general to an improved method and system for controlling the interaction between data and multiple applications in a data processing system and in particular to an improved method and system for automatically controlling the interaction between data and multiple applications in a data processing system. Still more particularly, the present invention relates to an improved method and system for automatically controlling the interaction between data and multiple applications in a data processing system utilizing a graphic interface.

2. Description of the Related Art

Modern state-of-the-art data processing systems permit a user to transfer text or data from one application to another existing application. This is generally permitted by allowing a user to outline a particular section of text or data and to perform a so-called "cut and paste" operation which removes the designated section of text or data from one application and permits that section to be manually transferred to a second application. The user must also place the "cut and paste" section of the text or data exactly within a desired field or section within the destination application, in order to properly utilize that data therein.

The process by which this transfer occurs typically requires the user to identify a destination application, open the source application, graphically designate the text or data within the source application and then transfer that graphically designated text or data to a designated location within the source application.

It should therefore be apparent that the process by which textual material or data may be transferred from one application to a second application is highly user/keystroke intensive and quite time consuming.

Recently, a new approach has been proposed for transferring text or data to a destination application which permits the graphic designation of several non-contiguous sections of data to a source destination in response to the graphic designation of that data. This process is disclosed in co-pending U.S. patent application Ser. No. 07/177,225, pending. As disclosed within this United States Patent Application the user may graphically identify multiple sections of text or data and each section of text or data is then automatically stored for future manipulation or utilization in response to the graphic designation of that data.

While this technique represents an enhanced efficiency in the ability of a user to designate selected sections of text or data within one application for transfer to a second application, it does not provide a technique whereby the user may efficiently access one of a plurality of applications utilizing designated text or data within a source application in an automatic and graphically intuitive manner. It should therefore be apparent that a need exists for a method and system which permits a graphic and intuitive interaction between data and multiple applications within a data processing system.

SUMMARY OF THE INVENTION

It is therefore one object of the present invention to provide an improved method and system for controlling the interaction between data and multiple applications in a data processing system.

It is another object of the present invention to provide an improved method and system for automatically controlling the interaction between data and multiple applications in a data processing system in response to the content of the data.

It is yet another object of the present invention to provide an improved method and system for automatically controlling the interaction between data and multiple applications within a data processing system utilizing a graphic interface.

The foregoing objects are achieved as in now described. The method and system of the present invention permit the automatic interaction between data and multiple application within a data processing system. A selectable graphic representation associated with each application is displayed within the data processing system and after user selection of a particular graphic representation, designated data is automatically transferred to or utilized to access the associated application. A distinctive highlight overlay is associated with each graphic representation and utilized to graphically highlight data selected by user for interaction with a selected application. Alternately, data selected by a user may be utilized to automatically select a particular application to transfer that data to or for access and the distinctive highlight overlay associated with the particular application is then utilized to visually confirm access to that application.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
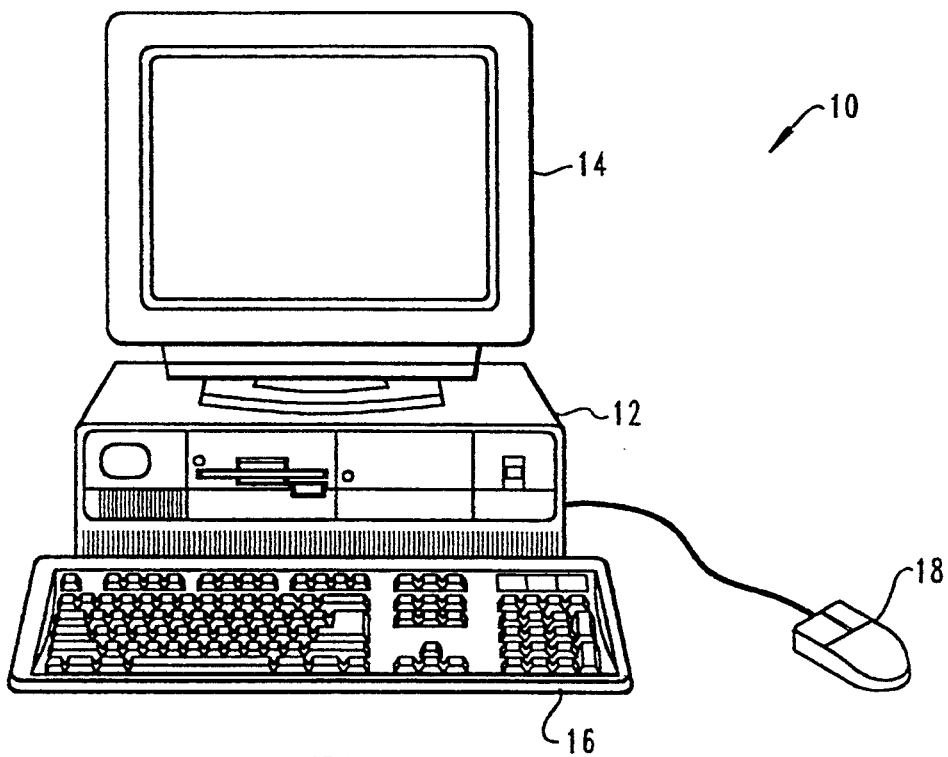
FIG. 1 is a pictorial representation of a data processing system which may be utilized to implement the method and system of the present invention.

With reference now to the figures and in particular with reference to FIG. 1, there is depicted a pictorial representation of the data processing system 10 which may be utilized to implement the method and system of the present invention. As illustrated, data processing system 10 preferably includes a processor 12 that is coupled to a display device 14 and keyboard 16 in a manner well known to those having ordinary skill in the art.

Also depicted in figure I is a graphical pointing device 18 which may be implemented utilizing a mouse, light pen, touch sensitive screen or any other suitable graphical indicating device which may be utilized to designate data or text in a manner which will be explained in greater detail herein. Those skilled in the art will appreciate, upon reference to FIG. 1, that data processing system 10 may be implemented utilizing any so-called "personal" computer, such as the International Business Machines Incorporation PS/2 personal computer or, by utilizing a terminal or intelligent work station coupled to a host computer.

Figure 2:
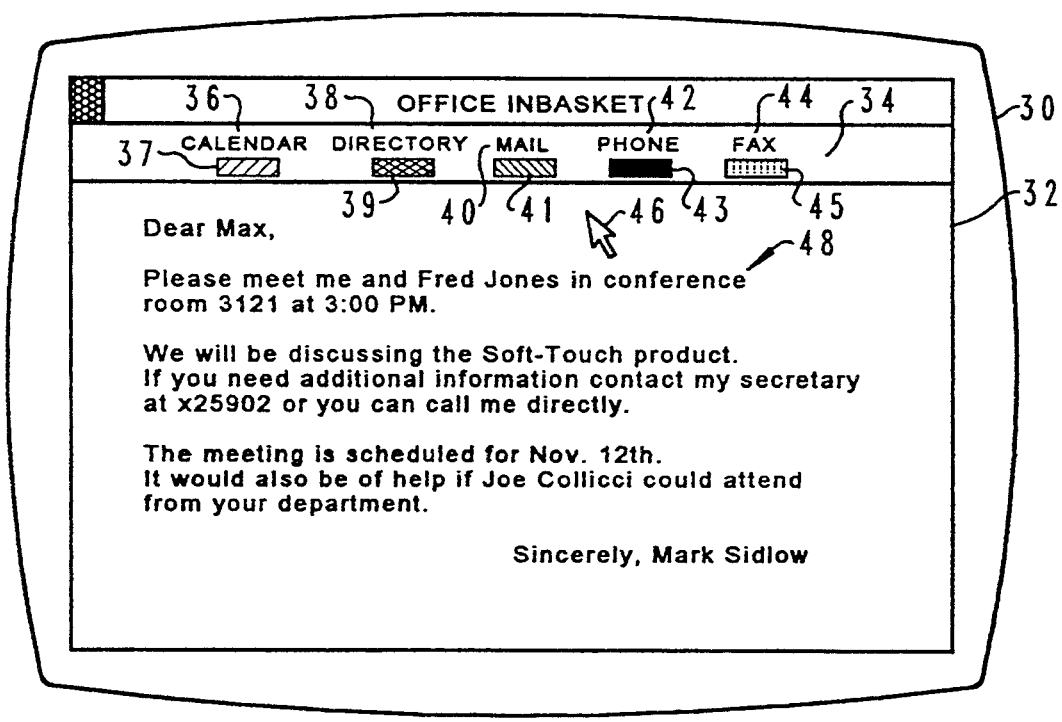
FIG. 2 is a pictorial representation of a computer display screen illustrating the method and system of the present invention.

Referring now to FIG. 2 there is depicted a pictorial representation of a computer display screen 30 which may be utilized to illustrate the method and system of the present invention. As depicted, computer display screen 30 may be utilized to depict an OFFICE INBASKET window 32 which comprises a well known viewport or "window" which is often utilized to present data or graphical representations in a modern state-of-the-art data processing system.

As illustrated within FIG. 2, OFFICE INBASKET window 32 includes an application control bar 34. Application control bar 34 preferably includes graphic representations of multiple applications within data processing system 10 including: calendar application 36; directory application 38; mail application 40; phone application 42 and facsimile application 44. In accordance with an important feature of the present invention, each graphic representation within application control bar 34 includes a distinctive highlight overlay. For example, the graphic representation of calendar application 36 includes a distinctive highlight overlay 37. Similarly, the graphic representation of directory application 38 includes a distinctive highlight overlay 39. Each remaining graphic representation within application control bar 34 also includes an associated distinctive highlight overlay.

As will be explained in greater detail herein, an associated distinctive highlight overlay may be utilized to identify sections of text or data which have been selected for transfer to or accessing of a particular application, in accordance with the method and system of the present invention. Those having ordinary skill in the graphic user interface art will appreciate that a user may graphically select one of the multiple graphic representations depicted within application control bar 34 utilizing any suitable graphical pointing device, such as mouse pointer 46.

Figure 3:
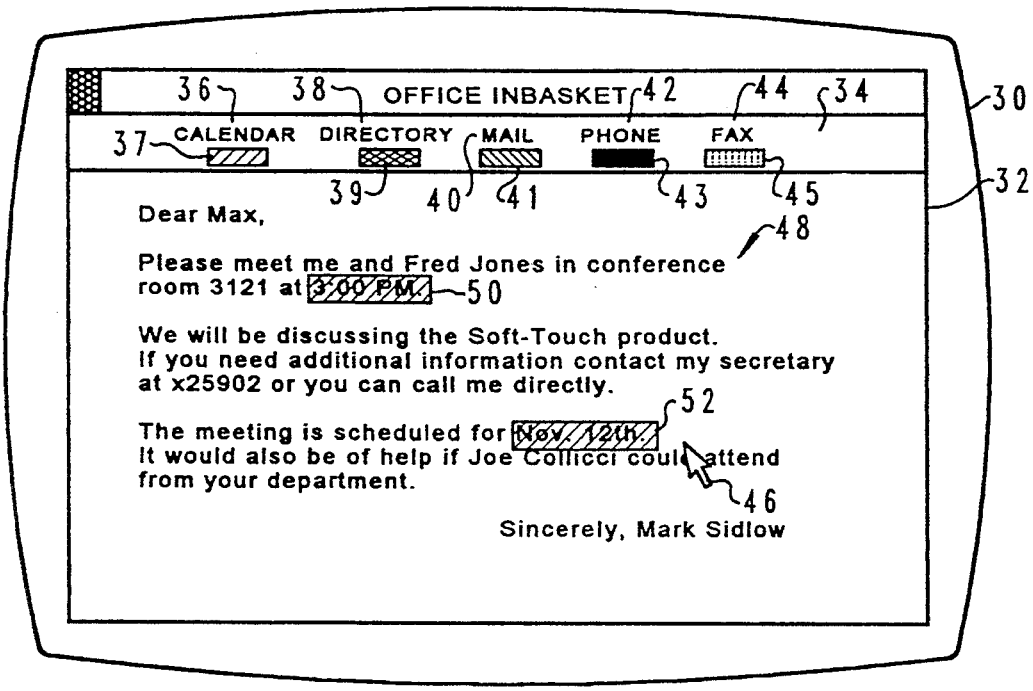
FIG. 3 is a pictorial representation of the computer display screen of FIG. 2 illustrating a graphic interaction between selected data and a particular application in accordance with the method and system of the present invention.

With reference now to FIG. 3, there is depicted a pictorial representation of computer display screen 30 of FIG. 2 illustrating a graphic interaction between selected data and a particular application in accordance with the method and system of the present invention.

As illustrated, selected data within textual display 48 has been graphically selected by the user utilizing mouse pointer 46, or a cursor, in a manner well known to those having ordinary skill in this art. As illustrated, a distinctive highlight overlay has been created and displayed overlying those portions of the data indicated at reference numerals 50 and 52.

The particular overlay depicted is, in accordance with the method and system of the present invention, indicative of the fact that the user has previously selected the graphic representation of calendar application 36 within application control bar 34. After having previously selected the graphic representation of calendar application 36 within control bar 34, the data graphically highlighted within textual data 48 at reference numerals 50 and 52 may be mapped directly to calendar application 36, or may be utilized to access a calendar application in a manner which will be explained in greater detail herein.

In accordance with the method and system of the present invention, a set of interaction specification rules may be set forth for calendar application 36 which specifies that the graphic selection of data within textural data 48, which is recognized as a time and/or date, may be preprocessed and utilized to enter a meeting within calendar application 36 for a user utilizing the method and system of the present invention. Alternately, interaction specification rules may be established for specifying an alternate state of interaction between data within textual data 48 and calendar application 36, which set forth that the selection of a portion of textual data 48 which is recognized as a name may be utilized to automatically access a calendar application associated with that individual within a distributed data processing network.

Upon reference to the foregoing those skilled in the art will appreciate that by setting forth and establishing a few simple interaction specification rules and, by previously designating a particular application within application control bar 34, a user of data processing system 10 may automatically transfer data, such as meeting parameters, to calendar application 36 in the graphic and intuitive manner set forth herein. Additionally, as described above, data may also be graphically selected within textual data 48 and utilized to access a calendar application belonging to a third party within a distributed data processing system, in accordance with interaction specification rules set forth for data which has been selected following selection by the user of a particular graphic representation within application control bar 34.

Figure 4:
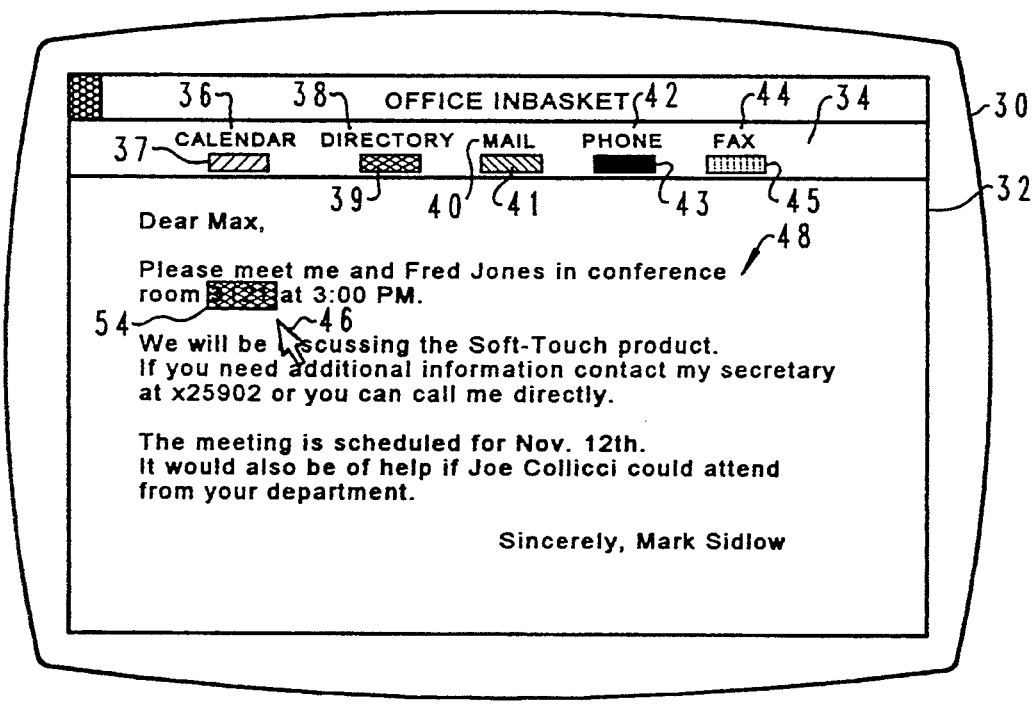
FIG. 4 is a pictorial representation of the computer display screen of FIG. 2 illustrating a graphic verification of an interaction between selected data and a particular application in accordance with the method and system of the present invention.

Referring now to FIG. 4, there is depicted a pictorial representation of computer display screen 30 of FIG. 2, which illustrates a graphic verification of an interaction between selected data and a particular application in accordance with the method and system of the present invention. As will be explained in greater detail below, it is possible to select particular data within textual data 48 without having previously designated a particular application within application control bar 34. In such situations the method and system of the present invention contemplates the establishment of a default application to be utilized when the user has graphically designated data within textual data 48 of a particular data type.

For example, by utilizing mouse pointer 46, or an application cursor, in a manner well known in the art, a portion of textual data 48 may be highlighted, as indicated at reference numeral 54. In accordance with the method and system of the present invention an interaction specification rule has been set forth which states that the selection of numerical data, such as that depicted within the area indicated at reference numeral 54, will be automatically utilized to access directory application 38. In accordance with an important feature of the present invention, a distinctive highlight overlay is graphically depicted at reference numeral 54 which is identical to distinctive highlight overlay 39, which is associated with the graphic representation of directory application 38. In this manner the user may graphically verify the result of the application of an interaction specification rule which specifies a default application and may therefore approve or disapprove of those results.

Figure 5:
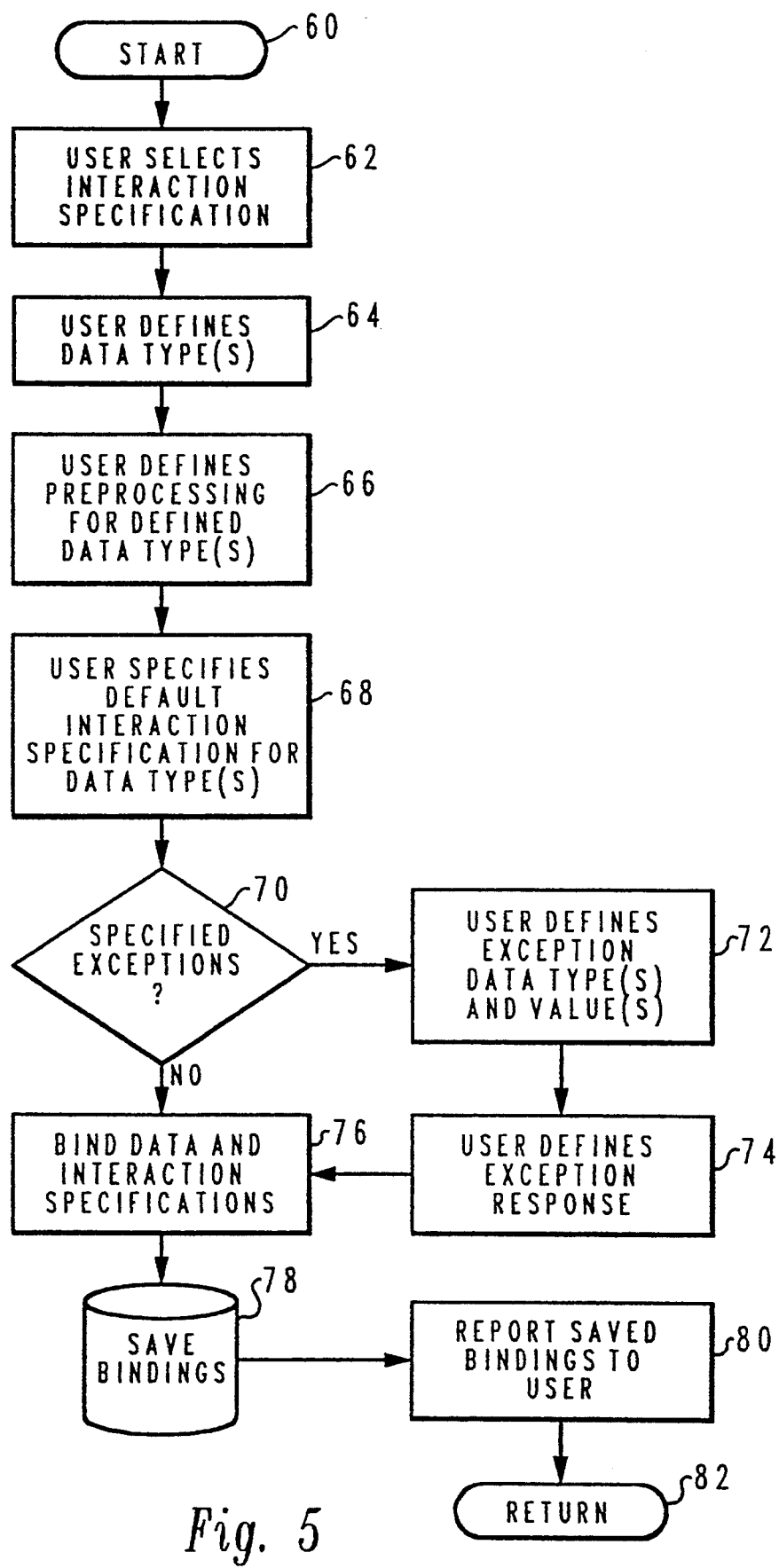
FIG. 5 is a high level logic flow chart illustrating the establishment of interaction specification rules between data and one or more applications in accordance with the method and system of the present invention.

With reference now to FIG. 5, there is depicted a high level logic flow chart which illustrates the establishment of interaction specification rules between data and one or more applications in accordance with the method and system of the present invention. As illustrated, the process begins at block 60 and thereafter passes to block 62. Block 62 illustrates the selection by the user of the process which may be utilized to establish interaction specification rules. Next, the process passes to block 64. Block 64 illustrates the defining by the user of a particular data type. For example, telephone numbers, dates, times, room numbers and names may all be specified as a particular type and are recognizable within data processing system 10 by virtue of the form and format followed for each such data types.

Next, the process passes to block 66. Block 66 the defining of any preprocessing for the defined data types by the user. Those having ordinary skill in the art will appreciate that in order to transfer data to a particular application or utilize data to access a particular application or portion thereof, it may be necessary to preprocess that data to place that data in an appropriate format or form for utilization by the application. Thereafter, the process passes to block 68. Block 68 illustrates the specification by the user of a default interaction rule for a particular data type. That is, data types may be identified by the user which, when selected, will automatically invoke a particular application within data processing system 10 without explicit selection by the user of that application within application control bar 34 (see FIGS. 2–4).

Next, the process passes to block 70. Block 70 illustrates another important feature of the present invention. Block 70 depicts a determination of whether or not exceptions within the defined data types exist which should not be processed or utilized in the manner of other defined data types within the data processing system. For example, a user may define an interaction specification rule which requires accessing a telephone application and returning a telephone call for all messages received in response to the graphic designation of a "name". The user may then list high ranking officials within his organization as exceptions to that interaction specification rule, prohibiting the automatic invocation of a telephone application in response to a message from such high ranking individuals.

If exceptions are to be listed the process passes to block 70. Block 70 illustrates the definition by the user of the particular data type and the value for that data type which are to be listed as exceptions. Thereafter, the process passes to block 74. Block 74 illustrates the defining by the user of the exception response. Of course, as will be apparent to those skilled in the art upon reference to the foregoing, an exception response may comprise no response. That is, no response is to be taken for data types having a value specified as an exception to the interaction specification rule.

Thereafter, or after determining that no exceptions are to be listed, the process passes to block 76. Block 76 illustrates the binding of the defined data types and values with the defined interaction specification rules and the process then passes to block 78. Block 78 illustrates the saving of these bindings and thereafter, as illustrated at block 80, the bindings are reported to the user prior to the process returning as depicted at block 82.

Thus, by following the process illustrated within FIG. 5 a user may specify a particular data type and particular values for that data type which may be utilized to automatically transfer data to a particular application or provide access to a particular application in accordance with the method and system of the present invention. Further, exceptions to these interaction specification rules may be set forth and stored within the data processing system, providing additional flexibility with respect to the process defined herein.

Figure 6A:
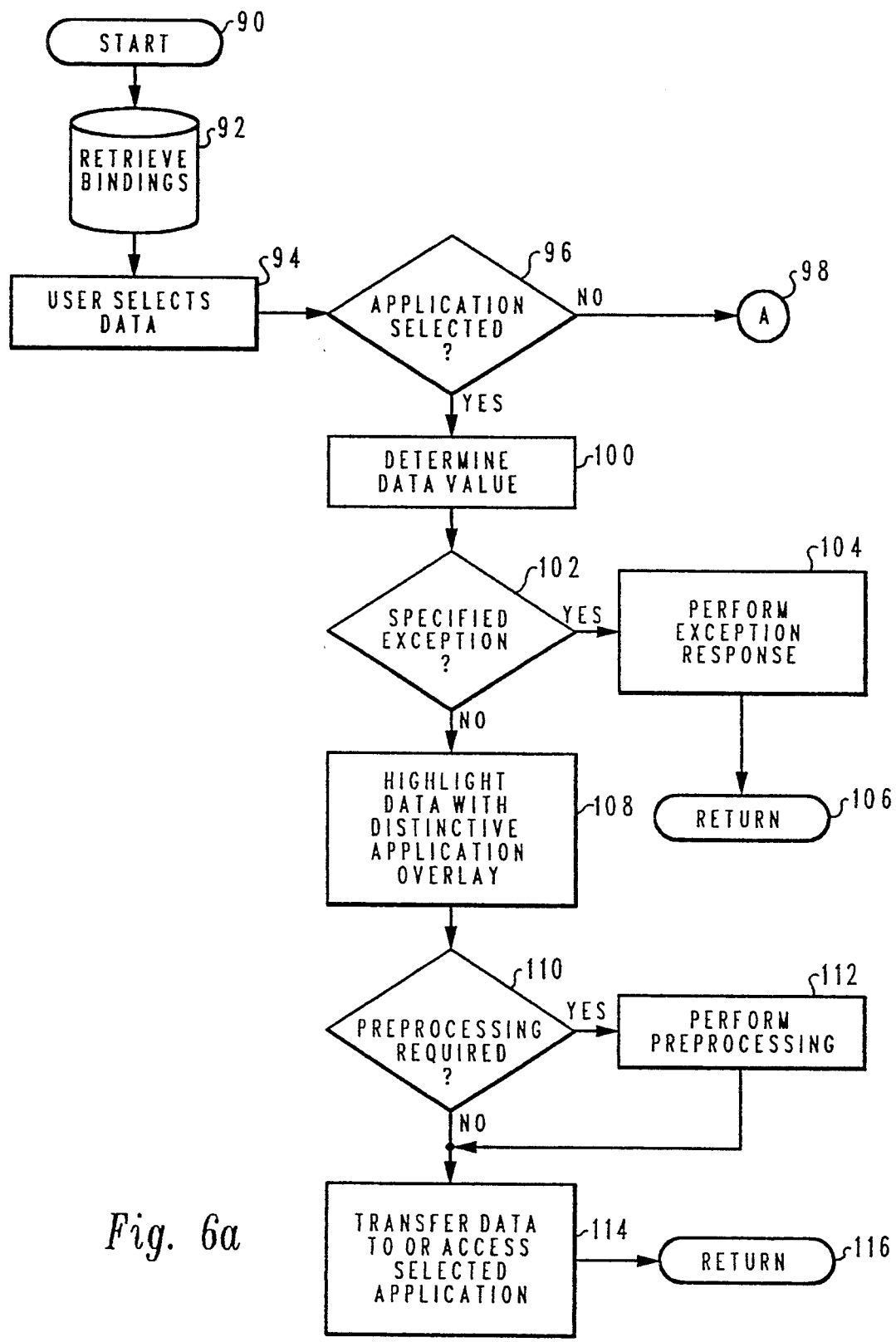
FIG. 6A and 6B form a high level flow chart illustrating the graphic initiation of interaction between data and one or more applications in accordance with the method and system of the present invention.
Figure 6B:
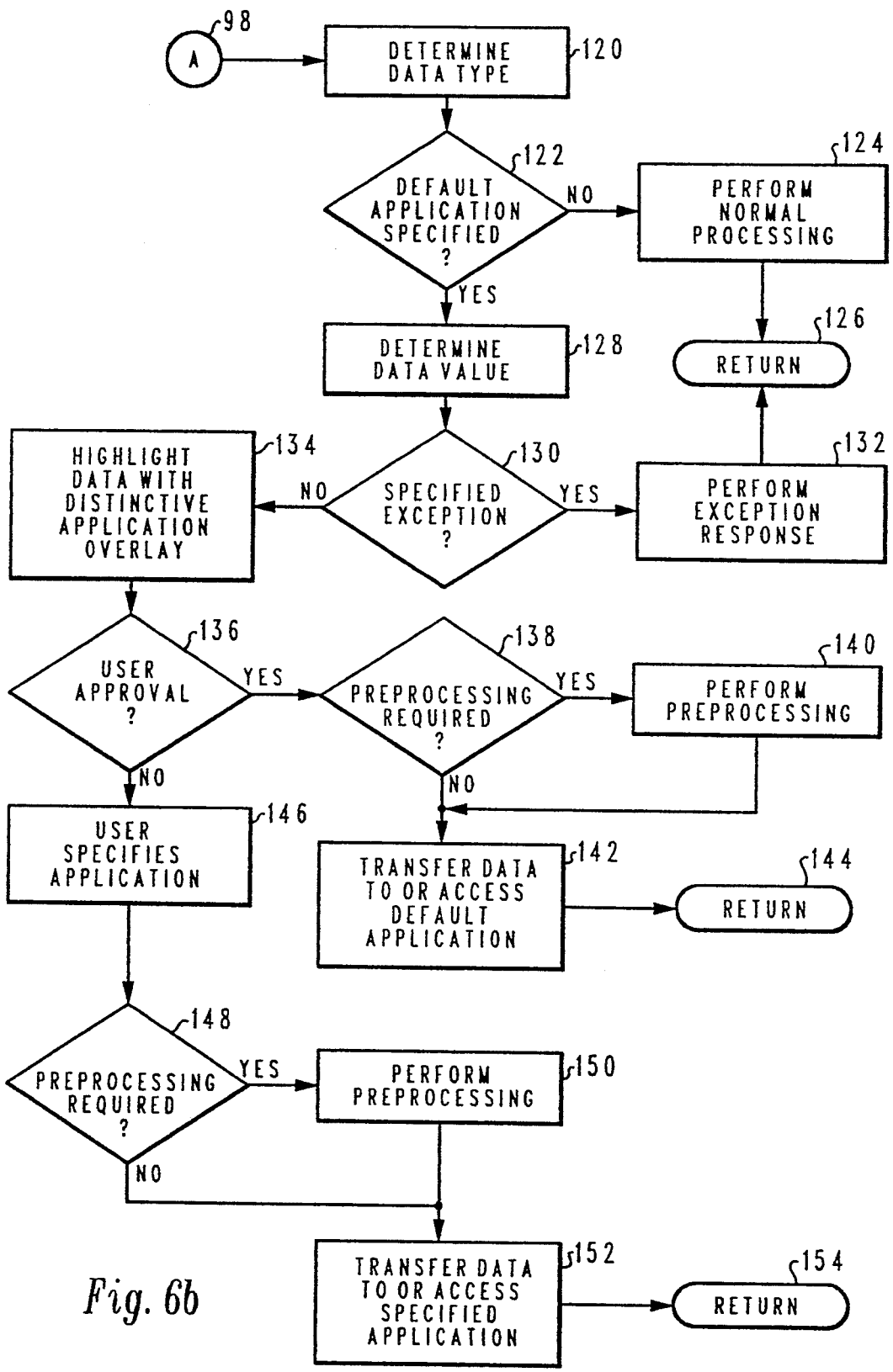

Referring now to FIGS. 6A and 6B, there is depicted a high level logic flow chart which illustrates the graphic initiation of an interaction between data and one or more applications in accordance with the method and system of the present invention. As depicted, the process begins at block 90 and thereafter passes to block 92. Block 92 illustrates the retrieval of the stored bindings within data processing 10 and the process then passes to block 94. Block 94 illustrates the selection by the user of a particular portion of the data displayed within the data processing system 10 and thereafter, the process passes to block 96. Block 96 depicts a determination of whether or not the user has previously graphically selected a particular application, by graphically selecting a graphic representation within application control bar 34. If not, the process passes to connector A, as depicted at block 98, and the process will thereafter continue as described below with respect to FIG. 6b.

Still referring to block 96, in the event the user has previously graphically selected a particular application, as represented by a graphic representation within application control bar 34, process passes to block 100. Block 100 illustrates a determination of the data value for the selected data and the process then passes to block 102. Block 102 illustrates a determination of whether or not the selected data is data which has been specified as an exception to the interaction specification rules. If so, the process passes to block 104 which illustrates the performance of the exception response and the process then returns, as depicted at block 106.

Referring again to block 102, in the event that data value determined for the selected data does not constitute a specified exception to the interaction specification rules, the process passes to block 108. Block 108 illustrates the highlighting of the selected data utilizing the distinctive highlight overlay associated with the selected application and the process then passes to block 110.

Block 110 illustrates a determination of whether or not preprocessing of the selected data is required prior to transferring that data to a selected application or accessing a selected application utilizing that data. If so, the process passes to block 112 which illustrates the performance of the required preprocessing. Thereafter, or after determining that no preprocessing is required, the process passes to block 114. Block 114 illustrates the transfer of the selected data to the selected application or the accessing of the selected application in the manner described above. Finally, the process then passes to block 116 and returns.

Referring now to FIG. 6b, if the user has selected data within block 94 of FIG. 6a and has not previously selected a particular application within application control bar 34 (see FIG. 2), the process passes via connector A, at reference numeral 98, to block 120. Block 120 illustrates a determination of the data type of the data selected by the user. Thereafter, the process passes to block 122. Block 122 illustrates a determination of whether or not a default application has been specified for this particular data type. If not, the process passes to block 124 which illustrates the normal processing of the selected data, in accordance with the application currently in use by the user of data processing system 10. The process then passes to block 126 and returns.

Referring again to block 122, in the event a default application has been specified for the data type selected by the user, the process passes to block 128. Block 128 illustrates the determination of the data value for the selected data. Next, the process passes to block 130. Block 130 illustrates a determination of whether or not the data value thus determined is specified as an exception to the interaction specification rules established as illustrated within FIG. 5. If so, the process passes to block 132 which illustrates the performance of the exception response, and once again, the process passes to block 126 and returns.

Referring again to block 130, in the event the data value determined is not specified as an exception to the interaction specification rules the process passes to block 134. Block 134, in accordance with an important feature of the present invention, illustrates the highlighting of the selected data utilizing the distinctive highlight overlay associated with the default application. In this manner the user may receive a visual confirmation of the application of the interaction specification rules and, as depicted at block 136, may be permitted to approve or disapprove of the application of those rules. Such approval may be identified utilizing selection of a mouse button, or by graphically selecting an appropriate response in a dialog box or similar structure.

Now referring to block 136, in the event the user approves of the selection of a default application, as determined by an application of the interaction specification rules, the process passes to block 138. Block 138 illustrates a determination of whether or not preprocessing of that data is required and if so, in the manner described above, the process passes to block 140. Block 140 illustrates the performance of the preprocessing of that data and thereafter, or after determining that no preprocessing of the data is required, the process passes to block 142. Block 142 illustrates the transferring of the data to or the accessing of the default application and thereafter, as depicted at block 144, the process returns.

Referring again to block 136, in the event the user does not approve of the automatically selected default application, as determined by application of interaction specification rules, the process passes to block 146. Block 146 illustrates the specification by the user of a particular application and the process then passes to block 148. As above, block 148 illustrates a determination of whether or not preprocessing of the data is required, and if so, the process is passed to block 150 which illustrates the performance of that preprocessing. Thereafter, or after determining as illustrated in block 148, that no preprocessing is required, the process passes to block 152. Block 152 illustrates the transferring of the data to or the accessing of the specified application and the process then passes to block 154 and returns.

Upon reference to the foregoing those skilled in the art will appreciate that by establishing a set of interaction specification rules, as described herein, a data processing system user may graphically select a particular application among a plurality of applications within a data processing system and thereafter automatically transfer data to that application, or access that application utilizing selected data, in a graphic and intuitive manner as described herein. Further, a default application may be specified within the interaction specification rules for a selected data type and graphic verification of that default application may be obtained by the user as a result of the utilization of a distinctive highlight overlay, in the manner described herein.

While the invention has been particularly shown and described with reference to a preferred embodiment, it will be understood by those skilled in the art that various changes in form and detail may be made therein without departing from the spirit and scope of the invention.

We claim:

1. A method for automatically transferring selected textual data within a data processing system having a graphical pointing device to one of a plurality of applications within said data processing system, said method comprising the steps of:
   displaying within said data processing system a graphic representation of each of said plurality of applications;
   associating a distinctive highlight overlay with each graphic representation of each of said plurality of applications:
   displaying within said data processing system a plurality of textual data;
   permitting a user to graphically select a particular graphic representation of a selected one of said plurality of applications utilizing said graphical pointing device;
   permitting a user to thereafter select particular portions of said plurality of textual data displayed within said data processing system;
   displaying an associated distinctive highlight overlay in association with said selected particular portion of said plurality of textual data in response to a selection of said particular portion of said plurality of textual data and a selection of a graphic representation of a particular one of said plurality of applications: and
   automatically transferring only said selected particular portions of said plurality of textual data within said data processing system to said selected one of said plurality of applications in response to said selection of said particular portion of said plurality of textual data.

2. The method for automatically transferring selected textural data within a data processing system according to claim 1, further including the step of preprocessing said selected particular portions of said plurality of textural data within said data processing system prior to transferring said selected particular portions of said plurality of textural data to said selected one of said plurality of applications.

3. A method for visually confirming access to one of a plurality of applications within a data processing system having a graphical pointing device in response to a graphic selection of data within said data processing system, said method comprising the steps of:
- displaying within said data processing system a graphic representation of each of said plurality of applications;
- associating a distinctive highlight overlay with each graphic representation;
- specifying a particular one of said plurality of applications to be accessed in response to selection of a particular type of data;
- displaying within said data processing system a plurality of data;
- permitting a user to select particular portions of said plurality of data displayed within said data processing system;
- selecting a particular one of said plurality of applications to access in response to a type of data within said selected particular portion of said plurality of data; and
- displaying a distinctive highlight overlay associated with said particular one of said plurality of applications over said selected particular portion of said plurality of data wherein visual confirmation of access to said particular one of said plurality of applications is provided.

4. The method for visually confirming access to one of a plurality of applications within a data processing system according to claim 3, further including the step of selecting an alternate one of said plurality of applications in response to a subsequent user input following said display of said distinctive highlight overlay associated with said particular one of said plurality of applications.

5. A data processing system for automatically transferring selected textual data to one of a plurality of applications within said data processing system, said data processing system comprising:
- means for displaying within said data processing system a graphic representation of each of said plurality of applications;
- means for associating a distinctive highlight overlay with each graphic representation of each of said plurality of applications:
- means for displaying a plurality of textual data within said data processing system;
- means for permitting a user to select a particular graphic representation of a selected one of said plurality of applications;
- means for permitting a user to thereafter select particular portions of said plurality of textual data displayed within said data processing system;
- means for displaying an associated distinctive highlight overlay association with said selected particular portion of said plurality of textual data in response to a selection of said particular portion of said plurality of textual data and a selection of a representation and a particular one of said plurality of applications; and
- means for automatically transferring only said selected particular portions of said plurality of textual data within said data processing system to said selected one of said plurality of applications in response to said selection of said particular portion of said plurality of textual data.

6. The method for automatically transferring selected textural data to one of a plurality of applications within said data processing system according to claim 5, further including means for preprocessing said selected particular portion of said plurality of textural data within said data processing system prior to transferring said selected particular portion of said plurality of textural data to said selected one of said plurality of applications.

7. A system for visually confirming accessing to one of a plurality of applications within a data processing system having a graphical pointing device in response to a graphic selection of data within said data processing system, said system comprising:
- displaying within said data processing system a graphic representation of each of said plurality of applications;
- associating a distinctive highlight overlay with each graphic representation;
- specifying a particular one of said plurality of applications to be accessed in response to selection of a particular type of data;
- displaying within said data processing system a plurality of data;
- permitting a user to select particular portions of said plurality of data displayed within said data processing system;
- selecting a particular one of said plurality of applications to access in response to a type of data within said selected particular portion of said plurality of data; and
- displaying a distinctive highlight overlay associated with said particular one of said plurality of applications over said selected particular portion of said plurality of data wherein visual confirmation of access to said particular one of said plurality of applications is provided.

8. The system for visually confirming access to one of a plurality of applications within a data processing system according to claim 7, further including means for selecting an alternate one of said plurality of applications in response to a subsequent user input following said display of said distinctive highlight overlay associated with said particular one of said plurality of applications.

* * * * *